United States Patent
Brimhall

(10) Patent No.: US 11,757,997 B2
(45) Date of Patent: Sep. 12, 2023

(54) SYSTEMS AND METHODS FOR FACILITATING SHARED EXTENDED REALITY EXPERIENCES

(71) Applicant: SEEK XR, INC., Lehi, UT (US)

(72) Inventor: Thane Brimhall, Saratoga Springs, UT (US)

(73) Assignee: SEEK XR, INC., Lehi, UT (US)

( * ) Notice: Subject to any disclaimer, the term of this patent is extended or adjusted under 35 U.S.C. 154(b) by 0 days.

(21) Appl. No.: 17/579,068

(22) Filed: Jan. 19, 2022

(65) Prior Publication Data

US 2022/0232104 A1 Jul. 21, 2022

Related U.S. Application Data

(60) Provisional application No. 63/139,137, filed on Jan. 19, 2021.

(51) Int. Cl.
*G06F 15/16* (2006.01)
*H04L 67/131* (2022.01)
*G06T 19/00* (2011.01)

(52) U.S. Cl.
CPC .......... *H04L 67/131* (2022.05); *G06T 19/006* (2013.01)

(58) Field of Classification Search
CPC ............................ H04L 67/131; G06T 19/006
USPC ....................................................... 709/203
See application file for complete search history.

(56) References Cited

U.S. PATENT DOCUMENTS

| | | | | |
|---|---|---|---|---|
| 7,532,224 B2 * | 5/2009 | Bannai | .................... | A63F 13/65 |
| | | | | 348/42 |
| 8,797,386 B2 * | 8/2014 | Chou | .................. | H04N 13/239 |
| | | | | 348/46 |
| 10,377,486 B2 * | 8/2019 | Kratz | ........................ | H04R 5/02 |
| 10,447,615 B2 * | 10/2019 | Re | .......... | H04L 47/821 |
| 10,678,323 B2 * | 6/2020 | Gibson | ................... | G06T 15/20 |
| 10,733,464 B2 * | 8/2020 | Kauffmann | ............ | G06V 20/56 |
| 10,984,607 B1 * | 4/2021 | Wang | ...................... | G06F 3/011 |
| 11,023,572 B2 * | 6/2021 | Chun | .................... | H04W 4/029 |
| 11,024,098 B1 * | 6/2021 | Drake | .................... | G06T 19/006 |
| 11,084,583 B2 * | 8/2021 | Kratz | .................... | B64C 39/024 |
| 11,521,356 B2 * | 12/2022 | Yan | ......... | G06V 20/20 |
| 2006/0227151 A1 * | 10/2006 | Bannai | .................... | A63F 13/00 |
| | | | | 345/633 |
| 2012/0268563 A1 * | 10/2012 | Chou | ....................... | G01S 15/89 |
| | | | | 381/310 |
| 2015/0326620 A1 * | 11/2015 | Kohnen | .............. | G06F 3/04842 |
| | | | | 715/730 |

(Continued)

*Primary Examiner* — Moustafa M Meky
(74) *Attorney, Agent, or Firm* — Workman Nydegger

(57) ABSTRACT

A system for facilitating shared XR experiences is configurable to access a first spatial map of a first physical environment associated with a first user and identify one or more first physical aspects of the first physical environment based on the first spatial map. The system is also configurable to access a second spatial map of a second physical environment associated with a second user and identify one or more second physical aspects of the second physical environment based on the second spatial map. The system is also configurable to define a first XR experience region for the first physical environment based on the second physical aspects of the second physical environment, or define a second XR experience region for the second physical environment based the first physical aspects of the first physical environment.

19 Claims, 11 Drawing Sheets

(56) References Cited

U.S. PATENT DOCUMENTS

| | | | |
|---|---|---|---|
| 2019/0114802 A1* | 4/2019 | Lazarow | H04W 56/001 |
| 2019/0318076 A1* | 10/2019 | Chun | G06V 20/20 |
| 2019/0318178 A1* | 10/2019 | Kauffmann | G06V 20/56 |
| 2020/0117267 A1* | 4/2020 | Gibson | G06F 3/011 |
| 2022/0101593 A1* | 3/2022 | Rockel | A63F 13/213 |
| 2022/0198764 A1* | 6/2022 | Nickerson | G06F 3/011 |

* cited by examiner

SYSTEMS AND METHODS FOR FACILITATING SHARED EXTENDED REALITY EXPERIENCES

CROSS-REFERENCE TO RELATED APPLICATIONS

This application claims priority to U.S. Provisional Patent Application Ser. No. 63/139,137, filed Jan. 19, 2021, and titled "SYSTEMS AND METHODS FOR FACILITATING SHARED EXTENDED REALITY EXPERIENCES", the entirety of which is incorporated herein by this reference.

BACKGROUND

In recent times, advances in computing power have enabled computing systems to provide new and varied experiences to users. One such category of new and varied user experiences relates to the areas of computer-implemented realities. For example, augmented reality (AR) may include a live, direct, or indirect view of a physical, real-world environment whose elements are augmented (or supplemented) by computer-generated sensory input such as sound, video, and/or graphics (e.g., virtual objects or holograms). AR utilizes a user's existing reality and adds to it via a computing device, display, or projector of some sort. For example, many mobile electronic devices, such as smartphones and tablets, can overlay digital content into the user's immediate environment through use of the device's camera feed and associated viewer. Thus, a user could view their real-world environment through the display of a mobile electronic device while virtual objects are simultaneously being displayed on the display, thereby augmenting the user's reality by giving the sensation that virtual objects exist with the user in their real-world environment. Other types of devices may also facilitate AR experiences, such as head-mounted displays (HMDs).

Virtual reality (VR) is another example of a computer-implemented reality. In general, VR refers to computer technologies that use HMDs and/or other peripheral devices to generate sounds, images, and other sensations that replicate a real environment or that form an imaginary world. VR immerses a user in an entirely virtual experience and allows the user to interact with the virtual environment. A VR environment may engage all five senses (taste, sight, smell, touch, sound), but as used herein, the term "virtual reality" or "VR" is intended to include those immersive computer-implemented realities that engage at least the user's sense of sight and that occlude the user's natural view of surrounding real-world objects/environments.

Another example of a computer-implemented reality is a hybrid reality called mixed reality (MR). Mixed reality represents the merging of real and virtual worlds to produce new environments and visualizations where physical and digital objects co-exist and may interact in real time. Many MR implementations place new imagery within a real space and often do so in such a way that the new imagery can interact—to an extent—with what is real in the physical world. For example, in the context of MR, a virtual object may be acted upon by physical forces within a real-world environment, such as where a user applies a force by pushing on a virtual surface of a virtual figurine, causing the virtual figurine to fall over. In MR systems, some synthetic content can react and/or interact with the real-world content in real time.

An umbrella term, namely extended reality (XR), incorporates all forms of computer-implemented reality content—AR, VR, MR, and/or others. As used herein, the term "extended reality" or "XR" refers generally to all environments that at least partially include virtual content and systems, methods, or techniques for providing or facilitating such environments. Extended reality includes all its descriptive forms, such as digital representations made or displayed according to AR, VR, or MR. XR environments are sometimes referred to as metaverses.

In some instances, users collaborate, compete, or otherwise simultaneously participate in XR experiences with other users. For example, multiple users may participate in a shared XR experience while positioned within the same real-world space (e.g., while positioned within the same physical room or building).

Users may also participate in a shared XR experience while positioned in separate physical spaces. For example, a first user may be positioned within a first real-world room at a first geographic location and a second user may be positioned within a second real-world room at a distant second geographic location. Facilitating shared XR experiences where users simultaneously participate from different real-world spaces is associated with many challenges.

Accordingly, there exists a need for improved systems and methods for facilitating shared XR experiences.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments of the present disclosure are directed to systems and methods for facilitating shared extended reality experiences, particularly where users simultaneously participate in a shared XR experience from different physical spaces.

In one aspect, a system for facilitating shared XR experiences is configurable to access a first spatial map of a first physical environment associated with a first user and identify one or more first physical aspects of the first physical environment based on the first spatial map. The system is also configurable to access a second spatial map of a second physical environment associated with a second user and identify one or more second physical aspects of the second physical environment based on the second spatial map. The system is also configurable to define a first XR experience region for the first physical environment based on the second physical aspects of the second physical environment, or define a second XR experience region for the second physical environment based the first physical aspects of the first physical environment.

In another aspect, a system for facilitating shared XR experiences is configurable to access a first spatial map of a first physical environment associated with a first user and determine a first interactable region for the first physical environment based on the first spatial map. The system is also configurable to access a second spatial map of a second physical environment associated with a second user and determine a second interactable region for the second physical environment based on the second spatial map. The system is also configurable to determine whether the first interactable region or the second interactable region comprises a limiting interactable region by comparing the first interactable region with the second interactable region. The system is also configurable to define a shared XR experience region based on the limiting interactable region and implement the shared XR experience region to facilitate a shared XR experience for the first user and the second user.

In another aspect, a system for facilitating shared XR experiences is configurable to access a first spatial map of a first physical environment associated with a first user and determine a first interactable region for the first physical environment based on the first spatial map. The system is also configurable to access a second spatial map of a second physical environment associated with a second user and determine a second interactable region for the second physical environment based on the second spatial map. The system is also configurable to determine whether the first interactable region and the second interactable region satisfy a shared XR experience region condition, and, in response to determining that the first interactable region and the second interactable region satisfy the shared XR experience region condition, facilitate a shared XR experience for the first user and the second user.

In another aspect, a system for facilitating shared XR experiences is configurable to obtain a first spatial map of a first physical environment associated with a first user, receive data representing one or more second physical objects of a second physical environment scanned by a second system associated with a second user, and generate a first XR experience region for the first physical environment. The first XR experience region comprises representations of the one or more second physical objects. The system is also configurable to present the first XR experience region to the first user to facilitate a shared XR experience with the second user.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

Additional features and advantages of the disclosure will be set forth in the description which follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims or may be learned by the practice of the disclosure as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof, which are illustrated in the appended drawings. It is appreciated that these drawings depict only typical embodiments of the disclosure and are not therefore to be considered to be limiting of its scope.

The disclosure will be described and explained with additional specificity and detail through the use of the accompanying drawings in which.

DETAILED DESCRIPTION

Figure 1:
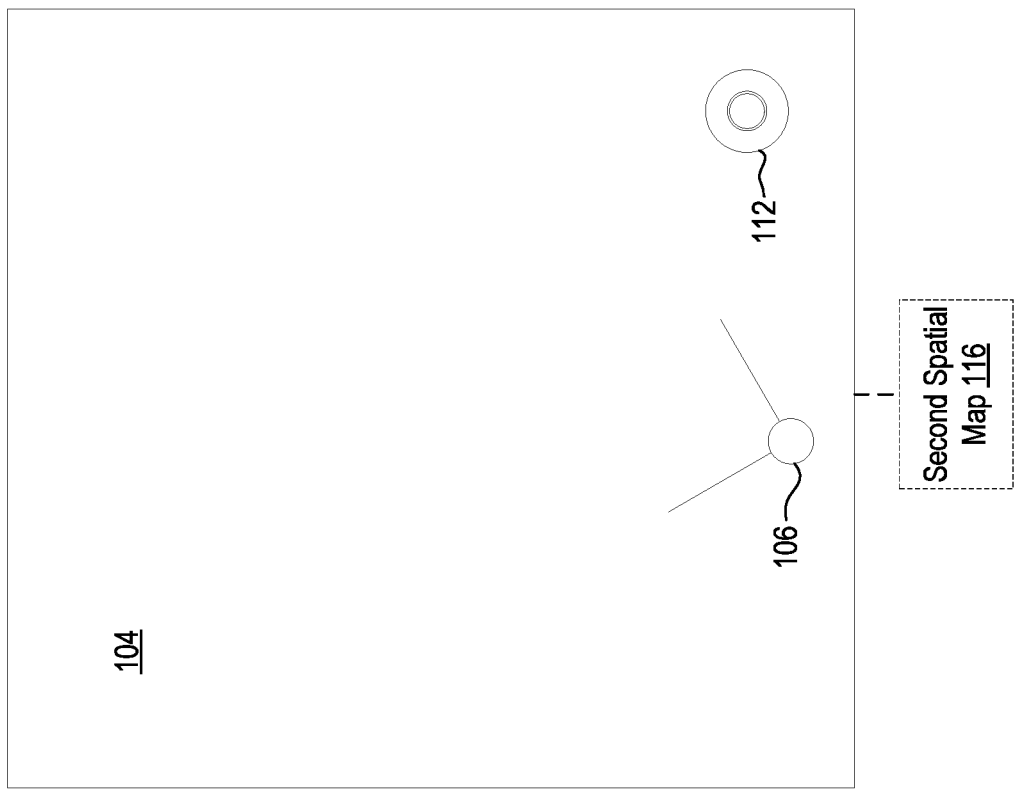
FIG. 1 illustrates a conceptual representation of separate physical environments associated with separate users.
Figure 1:
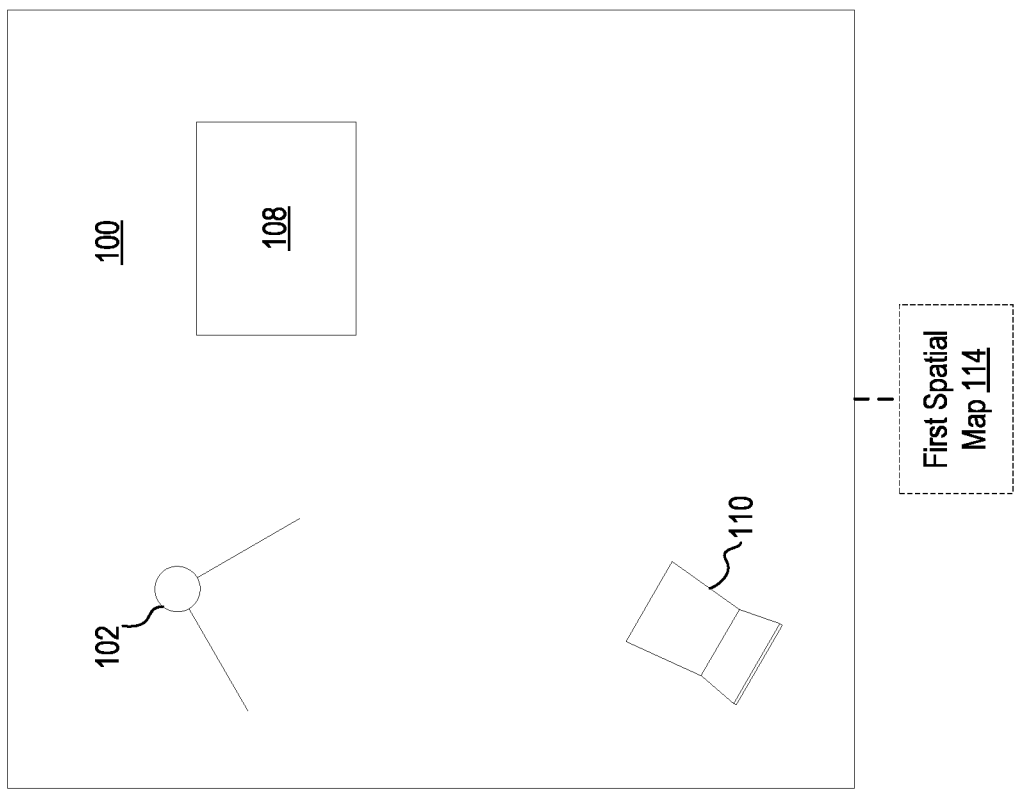

Before describing various embodiments of the present disclosure in detail, it is to be understood that this disclosure is not limited to the parameters of the particularly exemplified systems, methods, apparatus, products, processes, and/or kits, which may, of course, vary. Thus, while certain embodiments of the present disclosure will be described in detail, with reference to specific configurations, parameters, components, elements, etc., the descriptions are illustrative and are not to be construed as limiting the scope of the claimed invention. In addition, any headings used herein are for organizational purposes only, and the terminology used herein is for the purpose of describing the embodiments. Neither are not meant to be used to limit the scope of the description or the claims.

Embodiments of the present disclosure are directed to systems and methods for facilitating shared extended reality experiences, particularly for implementations in which users simultaneously participate in a shared XR experience from different physical spaces (e.g., physical spaces that comprise different types or arrangements of physical objects).

Those skilled in the art will appreciate, in view of the present disclosure, that at least some of the disclosed embodiments may address deficiencies associated with conventional systems and methods for facilitating shared mixed-reality experiences.

For example, where one user may have a large physical space to view or interact with virtual content during an XR experience, another user may have a smaller or more limited physical space to view or interact with virtual content during an XR experience. Additionally, or alternatively, separate physical spaces of separate users may include different physical objects or obstacles that may affect the space available to the separate users for participating in a shared XR experience. Differences such as the foregoing may result in differently sized and/or shaped interactable regions within the respective physical spaces of the users. An interactable region may comprise a reference area or volume within a physical space for facilitating XR experiences (e.g., by projecting virtual content such that the virtual content appears within the interactable region to a user operating an XR device).

Users may become frustrated when attempting to participate in a shared XR experience from separate physical environments with different types and/or arrangements of physical objects (e.g., walls, floors, ceilings, and/or other objects). For example, a user participating from a larger physical environment may create or move virtual content to a portion of the larger physical environment for which no corresponding portion of a separate smaller physical environment exists. Thus, the user participating from the separate smaller physical environment may fail to see or interact with such virtual content, causing a degraded shared XR experience.

Thus, at least some of the disclosed embodiments provide techniques for facilitating shared XR experiences between users in separate physical environments in a manner that accounts or accommodates for the differences between the separate physical environments of the users. For instance, by defining and/or implementing one or more XR experience regions for separate users based on different physical aspects/characteristics of the respective physical spaces associated with the separate users, disclosed embodiments may overcome at least some of the challenges noted above associated with facilitating shared XR experiences for users who are not participating in the same physical space but who nonetheless wish to engage in a shared XR experience to simulate being physically present with each other.

Disclosed embodiments may also advantageously determine whether the physical space available to a user desiring to participate in a shared XR experience is sufficient to facilitate such an XR experience in a desirable manner (e.g., an XR experience may require a minimum area or volume for a desirable experience). Thus, at least some disclosed embodiments may selectively refrain from initiating or facilitating an XR experience in response to determining that the physical space available to a user is deficient for presenting the XR experience in a desirable manner (e.g., as intended by the designer(s) of the XR experience).

Example Techniques for Facilitating Shared Extended Reality Experiences

Having described some of the various high-level features and benefits of the disclosed embodiments, attention will now be directed to FIGS. 1 through 11. These Figures illustrate various conceptual representations, architectures, methods, and/or supporting illustrations related to the disclosed embodiments.

FIG. 1 illustrates a conceptual representation of separate physical environments associated with separate users. In particular, FIG. 1 illustrates an example first physical environment 100 associated with a first user 102 and a second physical environment 104 associated with a second user 106. The first physical environment 100 and the second physical environment 104 may be distinct locations (e.g., physically separate rooms, or other physically separate spaces with different types and/or arrangements of physical objects therein), as illustrated in FIG. 1.

Each of the first physical environment 100 and the second physical environment 104 include an at least partially different arrangement of physical objects positioned therein. FIG. 1 illustrates an example in which the first physical environment 100 includes a table 108 and a chair 110, whereas the second physical environment 104 omits an identically arranged table and chair and instead includes a vase 112.

The first user 102 and the second user 106 may be operating XR devices and may desire to participate in a shared XR experience. As noted above, XR devices may take on a variety of forms, such as mobile electronic devices (e.g., smartphones, tablets), head-mounted displays (HMDs), and/or others. Additional details related to systems that may comprise or implement one or more of the disclosed embodiments (e.g., XR devices and/or others) will be provided hereinafter.

Systems may obtain data representative of the first physical environment 100 and the second physical environment 104. For example, an XR device associated with the first user 102 may obtain data describing the physical aspects of the first physical environment 100. Such physical aspects may include, for example, the relative sizes, shapes, positioning, and/or other attributes of the physical objects present within the first physical environment 100 (e.g., the table 108, the chair 110, the walls, ceiling, and/or floor of the first physical environment 100, etc.). Similarly, an XR device associated with the second user 106 may obtain data describing the physical aspects of the second physical environment 104. Such physical aspects may include, for example, the relative sizes, shapes, positioning, and/or other attributes of the physical objects present within the second physical environment 104 (e.g., the vase 112, the walls, ceiling, and/or floor of the second physical environment 104, etc.).

Such data may be obtained by XR devices in a variety of ways, and such data may take on a variety of forms. For example, an XR device associated with the first user 102 may perform simultaneous localization and mapping (SLAM) to obtain a first spatial map 114 of the first physical environment 100. Similarly, an XR device associated with the second user 106 may perform SLAM to obtain a second spatial map 116 of the second physical environment 104. A spatial map of an environment may take on a variety of forms and should be understood to encompass any type of data structure capable of describing objects three-dimensionally (e.g., a keyframe and anchor point mapping, a surface reconstruction mesh, a point cloud, and/or others). Furthermore, the present disclosure is not limited to SLAM as a technique for obtaining or generating a spatial map of an environment (e.g., characteristics of physical spaces may be manually entered via user input or obtained via other computer vision techniques).

Systems configured for facilitating the disclosed embodiments (e.g., an XR device associated with the first user 102, an XR device associated with the second user 106, remote systems/devices such as servers, and/or others) may access the first spatial map 114 and/or the second spatial map 116 (whether the spatial map(s) is/are stored locally or remotely). Based on a spatial map, a system may identify the physical aspects of the environments described by the spatial maps.

For example, by accessing the first spatial map 114, a system may identify representations of the physical objects within the first physical environment 100, such as the table 108, the chair 110, the walls, the ceiling, the floor, and/or others. Similarly, by accessing the second spatial map 116, a system may identify representations of the physical objects within the second physical environment 104, such as the vase 112, the walls, the ceiling, the floor, and/or others. In some instances, based on the representations of the physical objects within the first physical environment 100 and the second physical environment 104, a system may facilitate a shared XR experience for the first user 102 and the second user 106 in a manner that accounts for physical differences between the first physical environment 100 and the second physical environment 104.

Figure 2:
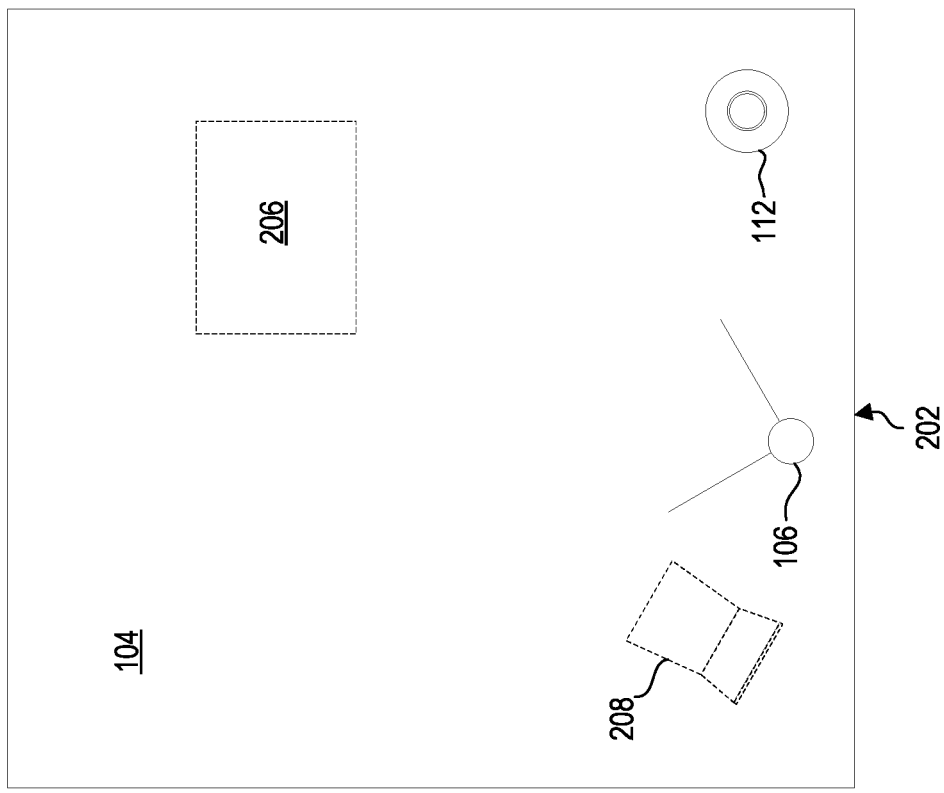
FIG. 2 illustrates a conceptual representation of XR experience regions for the separate physical environments from FIG. 1.
Figure 2:
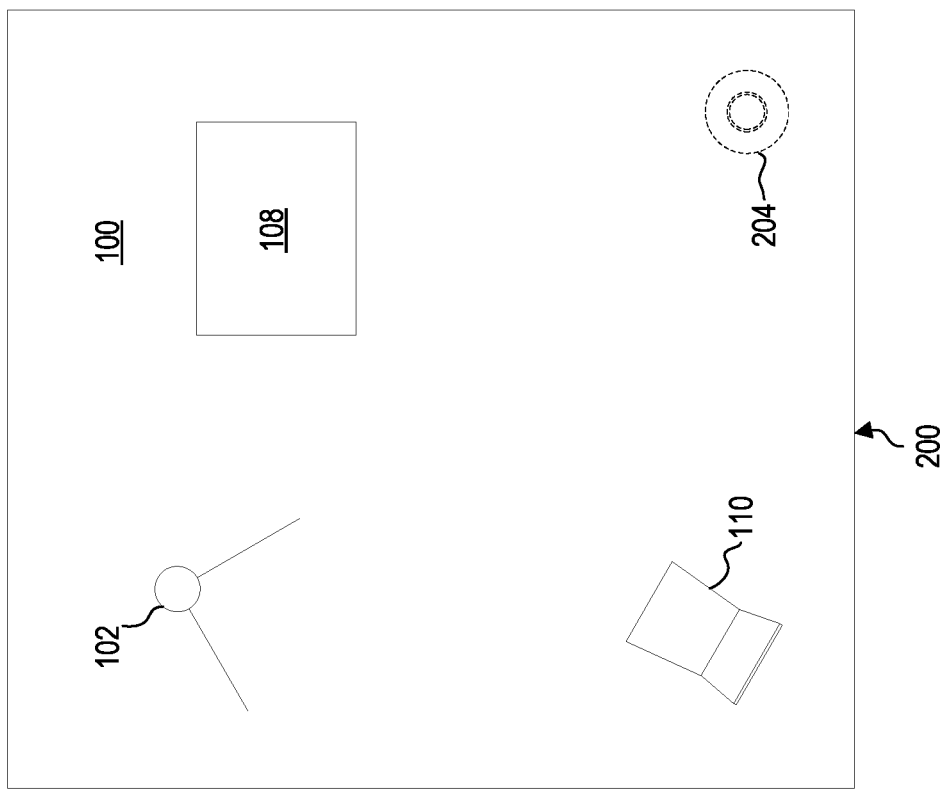

FIG. 2 illustrates a conceptual representation of XR experience regions for the separate physical environments from FIG. 1. In particular, FIG. 2 depicts a first XR experience region 200 for the first physical environment 100, as well as a second XR experience region 202 for the second physical environment 104. The XR experience regions may be defined based on the representations of physical objects represented in the first spatial map 114 and the second spatial map 116.

For example, the first XR experience region 200 of FIG. 2 is depicted as including the table 108 and the chair 110 as physical objects identified within the first physical environment 100. The first XR experience region 200 may account for the presence of the table 108 and chair 110 when defining the metes and bounds of an XR experience region to be implemented within the first physical environment 100. For example, constraints based on the size, position, and/or shape of the table 108 and chair 110 (e.g., as indicated by the first spatial map 114) may be implemented when generating the first XR experience region 200, such that virtual objects associated with a shared XR experience may be presented and/or interact based on the presence of the table 108 and chair 110 (or virtual representations thereof). For instance, a virtual object moving through the first XR experience region 200 may treat the table 108 and chair 110 as solid obstacles, preventing the virtual object from passing through the volume of the table 108 and chair 110 in an unrealistic manner.

Furthermore, the first XR experience region 200 may be defined at least partially based on the physical aspects of the second physical environment 104 as represented in the second spatial map 116. By way of example, FIG. 2 illustrates the first XR experience region 200 as including a vase 204 (shown in dashed lines) that corresponds to an analogous spatial position of the vase 112 within the second physical environment 104, indicating that the first XR experience region 200 may account for the presence of the vase 112 in the second physical environment 104. For instance, one or more constraints based on the size, position, and/or shape of the vase 112 (e.g., as indicated by the second spatial map 116) may be implemented when generating the first XR experience region 200, such that virtual objects associated with a shared XR experience may be also presented and/or interact based on the presence of the vase 204 (or a virtual representation thereof). For instance, a virtual object moving through the first XR experience region 200 may treat the (virtual) vase 204 as a solid obstacle, preventing the virtual object from passing through the volume of the vase 204 in an unrealistic manner.

Similarly, the second XR experience region 202 of FIG. 2 is depicted as including the vase 112 as a physical object identified within the second physical environment 104. The second XR experience region 202 may account for the presence of the vase 112 when defining the metes and bounds of an XR experience region to be implemented within the second physical environment 104. For example, constraints based on the size, position, and/or shape of the vase 112 (e.g., as indicated by the second spatial map 116) may be implemented when generating the second XR experience region 202, such that virtual objects rendered within a shared XR experience may be presented and/or interact based on the presence of the vase 112 (or a virtual representation thereof).

In addition, the second XR experience region 202 may be defined at least partially based on the physical aspects of the first physical environment 100 as represented in the first spatial map 114. By way of example, FIG. 2 illustrates the second XR experience region 202 as including a virtual table 206 and a virtual chair 208 (shown in dashed lines) that correspond, respectively, to the table 108 and chair 110 present within the first physical environment 100, indicating that the second XR experience region 202 may account for the presence of the table 108 and the chair 110 in the first physical environment 100. For instance, one or more constraints based on the size, position, and/or shape of the table 108 and the chair 110 (e.g., as indicated by the first spatial map 114) may be implemented when generating the second XR experience region 202, such that virtual objects associated with a shared XR experience may be also presented and/or interact based on the table 108 and the chair 110 (or virtual representations thereof).

As is evident from FIG. 2, the first XR experience region 200 and the second XR experience region 202 each comprise a substantially identical volume. The volume shared by the first XR experience region 200 and the second XR experience region 202 may be defined by boundaries that are shaped based on the objects represented in the first and second XR experience regions 200, 202. For instance, both the first XR experience region 200 and the second XR experience region 202 include representations of the table 108 and chair 110 from the first physical environment 100 and the vase 112 from the second physical environment 104.

In particular, FIG. 2 shows the first XR experience region 200 with a volume defined based on the physically present table 108 and chair 110 in addition to the virtual presence of the vase 204 (corresponding to the vase 112 of the second physical environment 104). Similarly, FIG. 2 shows the second XR experience region 202 with a substantially similar volume defined based on the vase 112, the table 206 (corresponding to the table 108 of the first physical environment 100), and the chair 208 (corresponding to the chair 110 of the first physical environment 100). The relative arrangement of the table 108, chair 110, and vase 204 in the first XR experience region 200 is substantially identical to the relative arrangement of the table 206, chair 208, and vase 112 in the second XR experience region 202. Thus, when the first user 102 and the second user 106 use the first XR experience region 200 and the second XR experience region 202 to participate in a shared XR experience, shared virtual content may be presented to both users within substantially identical environmental constraints.

By way of example, the first user 102 and the second user 106 may participate in a shared XR experience, and both users may participate from different physical environments that include different arrangements of physical objects (e.g., table 108, chair 110, vase 112, walls, ceilings, floors, etc.). Information describing the physical aspects of the different physical environments may be used to determine or define the first XR experience region 200 and the second XR experience region 202, such that both XR experience regions 200 and 202 include constraints that account for the physical objects present in both physical environments. An XR device associated with the first user 102 may present or display a representation of the first XR experience region 200 to the first user 102. The representation of the first XR experience region 200 may include a virtual representation of the vase 204 such that the vase 204 appears to the first user 102 at a particular position relative to the physical table 108 and the physical chair 110 within the first physical environment 100. Similarly, an XR device associated with the second user 106 may present a representation of the second XR experience region 202 to the second user 106, and the representation second XR experience region 202 may include virtual representations of the table 206 and the chair 208 such that the relative positioning of the virtual representations of the table 206, the chair 208, and the physical vase 112 within the second XR experience region 202 substantially matches the relative positioning of the physical table 108, the physical chair 110, and the virtual representation of the vase 204 within the first XR experience region 200. In this way, the first XR experience region 200 and the second XR experience region 202 may be configured to comprise a substantially identical volume (e.g., play space or interaction space) that virtual content may be presented or interacted relative to.

For instance, where the shared XR experience includes controllable virtual aerial drones, the movement of the drones may be constrained within the first XR experience region 200 by the physical table 108, the physical chair 110, and the virtual representation of the vase 204, such that the drones may be configured to crash when directed into space occupied by objects treated as solid obstacles, such as the physical table 108, the physical chair 110, or the virtual representation of the vase 204. Similarly, the movement of the drones may be constrained within the second XR experience region 202 by the physical vase 112, the virtual representation of the table 206, and the virtual representation of the chair 208, such that the drones may be configured to crash when directed into space occupied by objects treated as solid obstacles, such as the physical vase 112, the virtual representation of the table 206, or the virtual representation of the chair 208. In this way, a shared XR experience may be provided for the first user 102 and the second user 106 where both users experience the same environmental constraints, even where the users participate from different physical spaces with different arrangements of physical objects.

Although the foregoing example focuses, in at least some respects, on implementations where the XR experience regions are defined in terms of volume, one will appreciate, in view of the present disclosure, that an XR experience may be defined in terms of area, depending on the shared XR experience for which the XR experience regions are generated. For example, where the shared XR experience comprises a miniature golf experience, the XR experience regions may be established based on available floor area within the different physical environments and remain agnostic toward physical objects occupying space above the floors of the different physical environments.

One will appreciate, in view of the present disclosure, that a first XR experience region 200 and/or a second XR experience region 202 may be generated/defined in a variety of ways by a variety of systems. For instance, an XR system associated with the first user 102 may receive data representing the vase 112 (and/or other objects) from the second physical environment 104. Such data may be obtained/captured by an XR system associated with the second user 106 (e.g., a device that scans the second physical environment 104 to generate a second spatial map 116 therefor) and transmitted to the XR system associated with the first user 102. The XR system associated with the first user 102 may then use the data to generate the first XR experience region 200 and/or a virtual representation thereof (e.g., including virtual representations of objects from the second physical environment 104) for use within the first physical environment 100. Similarly, an XR system associated with the second user 106 may receive data representing the table 108 and the chair 110 (and/or other objects) from the first physical environment 100. Such data may be obtained/captured by an XR system associated with the first user 102 (e.g., a device that scans the first physical environment 100 to generate a first spatial map 114 therefor) and transmitted to the XR system associated with the second user 106. The XR system associated with the second user 106 may then use the data to generate the second XR experience region 202 and/or a virtual representation thereof (e.g., including virtual representations of objects from the first physical environment 100) for use within the second physical environment 104. Accordingly, the processing associated with generating an XR experience region (or any functionality described herein) may be performed by an XR device associated with a user, other devices such as servers and/or other remote systems (e.g., cloud systems), and/or combinations thereof.

Furthermore, although the foregoing description differentiates between the first XR experience region 200 and the second XR experience region 202, one will appreciate, in view of the present disclosure, that different XR experience regions may be regarded as or based on a singular shared XR experience region (e.g., because XR experience regions for facilitating the same XR experience may comprise substantially identical virtual object constraints for carrying out the XR experience).

FIGS. 1 and 2 focus, in at least some respects, on examples in which the first physical environment 100 and the second physical environment 104 comprise substantially similar rooms (e.g., with a substantially identical arrangement of walls, ceilings and floors), with the only physical differences between the rooms comprising the physical items arranged therein. However, one will appreciate that the principles discussed herein may be applied to account for any differences in the physical objects of different physical environments/spaces (e.g., differences in walls, ceilings, floors, room size, etc.).

Figure 3:
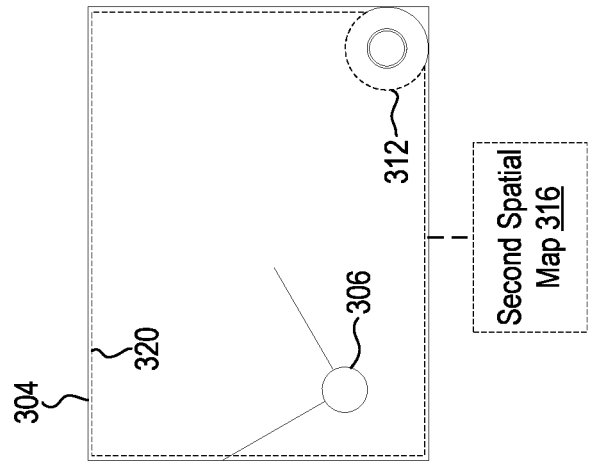
FIG. 3 illustrates a conceptual representation of interactable regions of separate physical environments.
Figure 3:
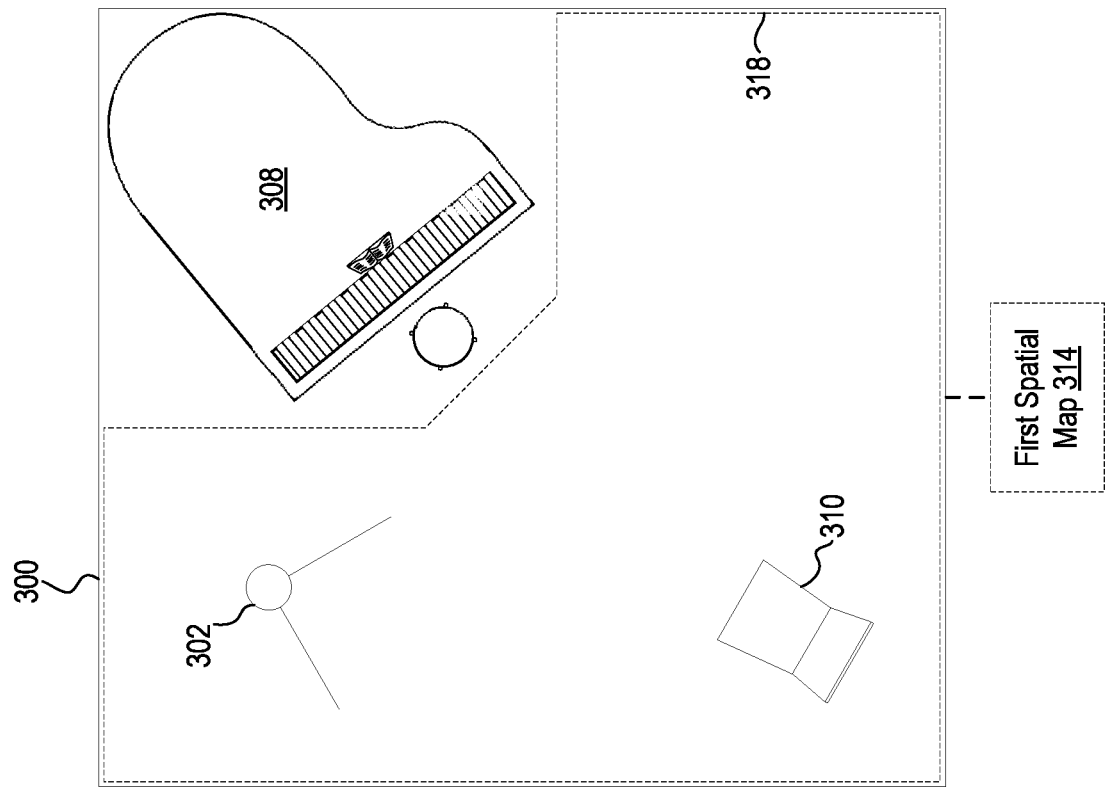

For example, FIG. 3 illustrates a conceptual representation of a first physical environment 300 associated with a first user 302 and a second physical environment 304 associated with a second user 306. As is evident from FIG. 3, the first physical environment 300 comprises a differently sized room relative to the second physical environment 304. Furthermore, the first physical environment 300 includes a piano 308 and a chair 310, whereas the second physical environment includes only a vase 312. Although not explicitly shown in FIG. 3, other differences may also exist between the first physical environment 300 and the second physical environment 304, such as the ceiling height or fixtures, floor levelness/material, wall texturing, window/door placement/configuration, and/or other differences. The principles of the present disclosure may be applied to facilitate a shared XR experience for the first user 302 and the second user 306 in a manner that accounts for the differences between the physical environments from which the users will participate.

As noted above, the physical characteristics or aspects of the first physical environment 300 may be represented within a first spatial map 314, and the physical characteristics or aspects of the second physical environment 304 may be represented within a second spatial map 316. Based on the spatial maps (e.g., the absolute and/or relative positions of objects represented in the spatial maps), one or more systems may determine or define a first interactable region 318 for the first physical environment 300 and a second interactable region 320 for the second physical environment 304. An interactable region may comprise the area or volume within a physical environment that is available for virtual content to be interacted with and/or presented relative to. For instance, for an XR experience that involves creating and/or moving virtual objects, an interactable region may include the area or volume within a physical environment (or representation of a physical environment) within which the virtual objects may be created or moved. In this regard, different interactable regions may be defined for the same physical environment based on the shared XR experience that will be implemented within the respective physical environments (e.g., one interactable region may be defined for playing a miniature golf game within a physical space, whereas another interactable region may be defined for playing a drone racing game within the same physical space).

As noted above, the first interactable region 318 may include an area (e.g., floorspace, wall space, or ceiling space within the first physical environment) or volume defined by boundaries associated with objects within the first physical environment 300. By way of example, FIG. 3 depicts boundaries of the first interactable region 318 (shown in dashed lines) as substantially following the walls of the first physical environment 300 while omitting the portion of the room occupied by the piano 308. In this regard, the boundaries may be based on characteristics of the physical objects (e.g., the piano 308, the chair 310, the walls, etc.) as represented within the first spatial map 314. Such characteristics may include object type, size, shape, absolute or relative arrangement, and/or others. For instance, a system may determine that the size or shape of the piano 308 and/or the arrangement of the piano 308 relative to the walls satisfy conditions for omitting the portion of the physical environment 300 that includes the piano 308 from the first interactable region 318 for the first physical environment 300. Such conditions may, as noted above, depend on the particular XR experience that will be implemented for the first user 302 in association with the first physical environment 300. For instance, if the space between the piano 308 and one or more of the walls, ceiling, or floor of the first physical environment 300 are below a threshold (so as to preclude entry of a drone therein), such space may be omitted from the first interactable region 318. In other instances, a system may determine that the floor area occupied by the piano is minimal and therefore establish boundaries for the first interactable region 318 that encompass the floor space beneath the piano 308 (e.g., for a miniature golf game).

In some instances, a user may be presented with an interface for modifying an interactable region associated with their physical space for generating/defining an XR experience region. For instance, a user may provide input at a user device (e.g., an XR device) to modify an auto-generated interactable region to omit certain portions of their physical environment according to their desires (e.g., to omit portions of a physical environment that are proximate to delicate items, such as a television, ceramicware, etc.). In some instances, users may be provided with functionality for selectively modifying the XR experience region itself.

FIG. 3 also illustrates the boundaries of the first interactable region 318 as encompassing the chair 310. For example, a system may determine that characteristics of the chair 310 allow the boundaries of the first interactable region 318 to be formed to account for the presence of the chair 310 within the first physical environment 300 such that virtual objects may interact with the chair 310 as part of a shared XR experience. In some instances, at least some boundaries of the first interactable region 318 may correspond to the surfaces of the chair 310.

FIG. 3 shows that the boundaries of the second interactable region 320 substantially follow the walls of the second physical environment 304 while forming to at least some surfaces of the vase 312. FIG. 3 illustrates that the second interactable region 320 may comprise a smaller volume or area than the first interactable region 318. Thus, facilitating a shared XR experience for the first user 302 and the second user 306 may present challenges. For instance, were the users to participate in a shared XR experience based on their respective interactable regions, the first user 302 may inadvertently create or move virtual content to a portion of the first interactable region 318 for which no corresponding portion of the second interactable region 320 exists, thereby preventing the second user 306 from perceiving or interacting with the virtual content created or moved by the first user 302 (e.g., without rescaling the play areas).

Thus, in accordance with the present disclosure, one or more systems may compare the first interactable region 318 to the second interactable region 320 to determine whether the first interactable region 318 or the second interactable region 320 is a limiting interactable region. A limiting interactable region may comprise an interactable region that places greater constraints on an XR experience that can be implemented based on a physical environment. In this regard, the manner in which an interaction region may be considered limiting may depend on the particular XR experience that will be implemented based on the physical environment. For instance, for an XR experience for miniature golf may consider a physical environment with less available floor space as limiting, even where the physical environment with less available floor space has a greater total volume of space available (e.g., by reason of high ceilings). As another example, for an XR experience that involves activities where one or more particular dimensions of available space is of higher importance (e.g., height, length, width, etc.), such dimensions of the physical environments may be considered when determining a limiting interactable region (e.g., in a weighted manner).

In the example shown in FIG. 3, the second interactable region 320 may be considered the limiting interactable region. Thus, one or more systems may determine first and second XR experience regions (or a shared XR experience region) for the first and second physical environments 300, 304 based at least in part on the boundaries of the second interactable region 320.

Figure 4:
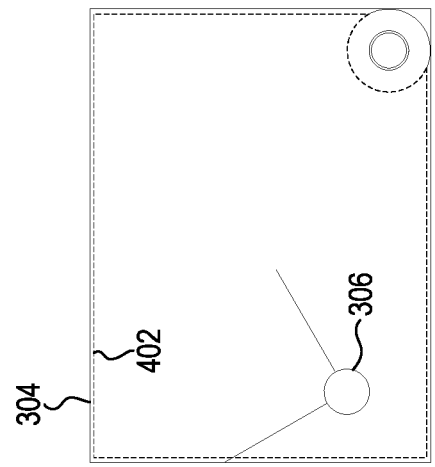
FIG. 4 illustrates a conceptual representation of XR experience regions for the separate physical environments from FIG. 3.
Figure 4:
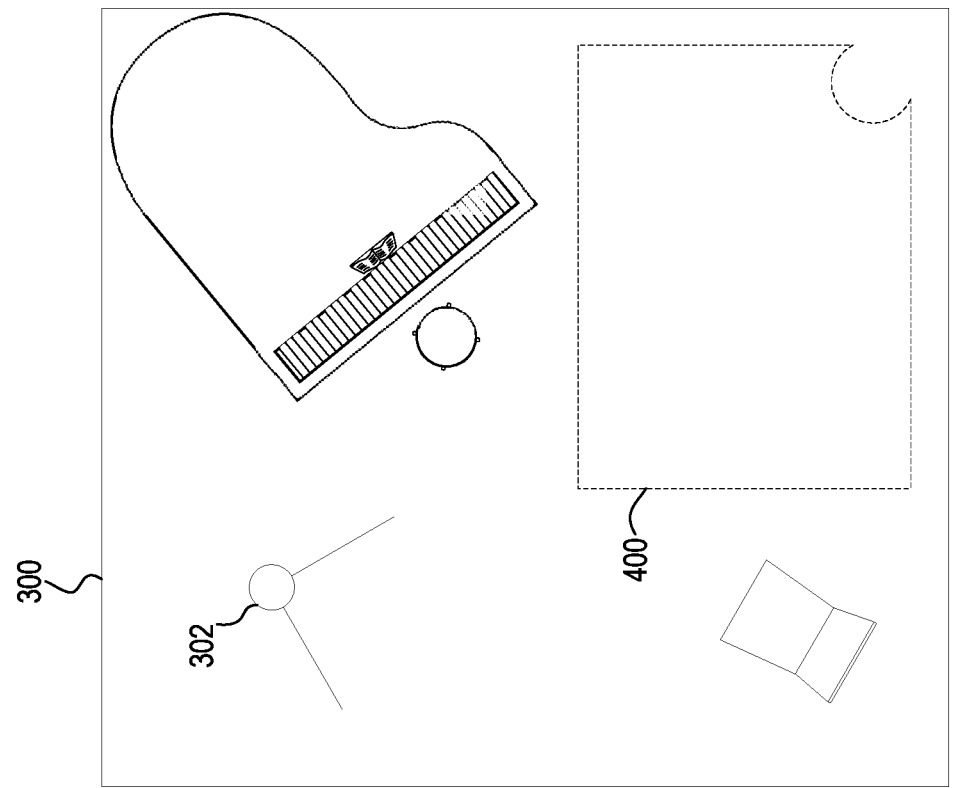

FIG. 4 illustrates a conceptual representation of XR experience regions for the separate physical environments from FIG. 3. In particular, FIG. 4 illustrates a first XR experience region 400 for the first physical environment 300 and a second XR experience region 402 for the second physical environment 304. As noted above, the second interactable region 320 may be considered the limiting interactable region as compared to the first interactable region 318. Thus, in some implementations, the first XR experience region 400 may be defined at least in part by applying constraints based on the second interactable region 320, such as the boundaries of the second interactable region 320, which boundaries may be determined based on physical objects of the second physical environment 304 (e.g., the vase 312, the walls, ceiling, floor, and/or other objects). In this way, the first XR experience region 400 and the second XR experience region 402 may be configured to comprise a substantially identical volume or area to facilitate a shared XR experience.

As is evident from FIG. 4, the first XR experience region 400 may fit within the first physical environment 300 in various ways, and FIG. 4 illustrates just one example placement/configuration. In some instances, the positioning of the first XR experience region 400 relative to the other structures within the first physical environment 300 is automatically determined or selected (e.g., in compliance with proximity thresholds to other objects of the first physical environment 300). In some instances, the first user 302 provides user input directing the placement of the positioning of the first XR experience region 400 relative to the other structures of the first physical environment 300.

As indicated above, an XR system associated with the first user 302 may trigger display of a representation of the first XR experience region 400 on a display for viewing by the first user 302. In some instances, the representation of the first XR experience region 400 includes virtual content that portrays the boundaries and/or other aspects of the first XR experience region 400. For example, an XR system may present virtual representations of walls, ceilings, floors, or other objects (e.g., representations of objects from the physical environment associated with the limiting interactable region) to visually depict the boundaries of the first XR experience region 400. An XR system may otherwise emphasize or highlight boundaries of the first XR experience region 400 to the first user 302.

FIG. 4 shows that the second XR experience region 402 corresponds in size and shape to the first XR experience region 400 and may be presented to the second user 306 within the second physical environment 304. Accordingly, the first user 302 and the second user 306 may participate in a shared XR experience implementing, respectively, the first XR experience region 400 within the first physical environment 300 and the second XR experience region 402 within the second physical environment 304.

Figure 5:
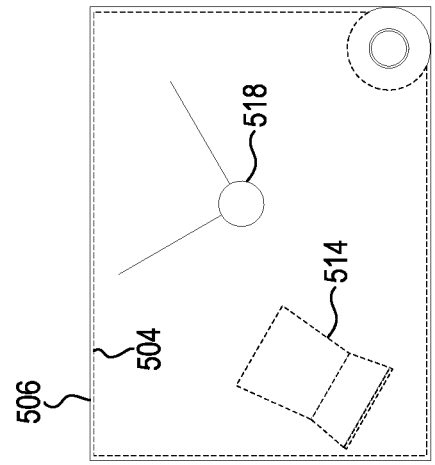
FIG. 5 illustrates a conceptual representation of XR experience regions for separate physical environments.
Figure 5:
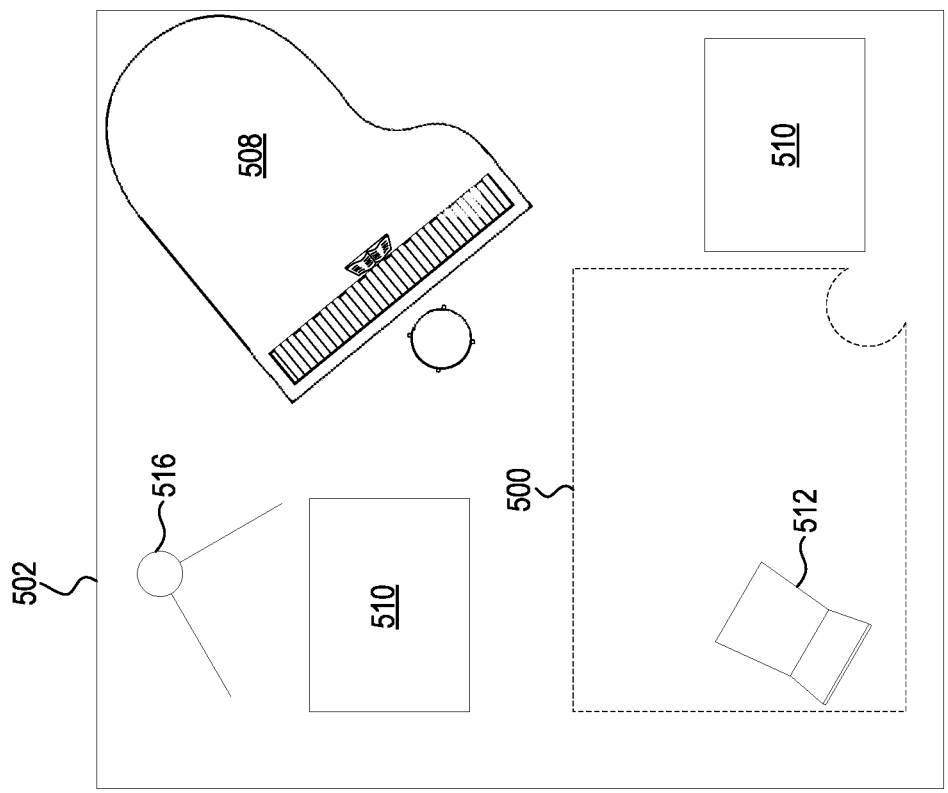

One will appreciate, in view of the present disclosure, that XR experience regions may be defined based on physical objects from an environment associated with a limiting interactable region, as well as physical objects from an environment that is not considered a limiting interactable region. For instance, FIG. 5 shows a first XR experience region 500 associated with a first physical environment 502 and a second XR experience region 504 associated with a second physical environment 506. The second physical environment 506 may be associated with a limiting interactable region similar to the second interactable region 320 described hereinabove with reference to FIG. 3. Accordingly, the first XR experience region 500 and the second XR experience region 504 may be defined based on the boundaries of the limiting interactable region associated with the second physical environment 506.

However, FIG. 5 shows that the first physical environment 502 includes several pieces of furniture, including a piano 508, tables 510, and a chair 512. Accordingly, the first physical environment 502 may lack a volume or area that is entirely free of physical objects for positioning of a first XR experience region 500 that corresponds to the boundaries of the limiting interactable region associated with the second physical environment 506. Thus, in some instances, one or more systems may establish a first XR experience region 500 based on a portion of the first physical environment 502 that includes one or more physical objects, such as the chair 512, as shown in FIG. 5. Spatial mapping data associated with the chair 512 may be used to form constraints for defining/modifying the first XR experience region 500 and the second XR experience region 504 (e.g., in addition to constraints associated with the limiting interactable region associated with the second physical environment 506). A representation of the second XR experience region 504 may include a virtual representation of the chair 514, such that the geometry of the first XR experience region 500 and the second XR experience region 504 appears similar to the first user 516 and the second user 518, respectively.

In some instances, the physical space available to a user for participating in a shared XR experience is not sufficient to provide a desirable shared XR experience. For instance, where an XR experience involves a game that has a play area or volume of a predefined size, users attempting to participate in such an experience without a sufficiently large physical space available may become frustrated.

Figure 6:
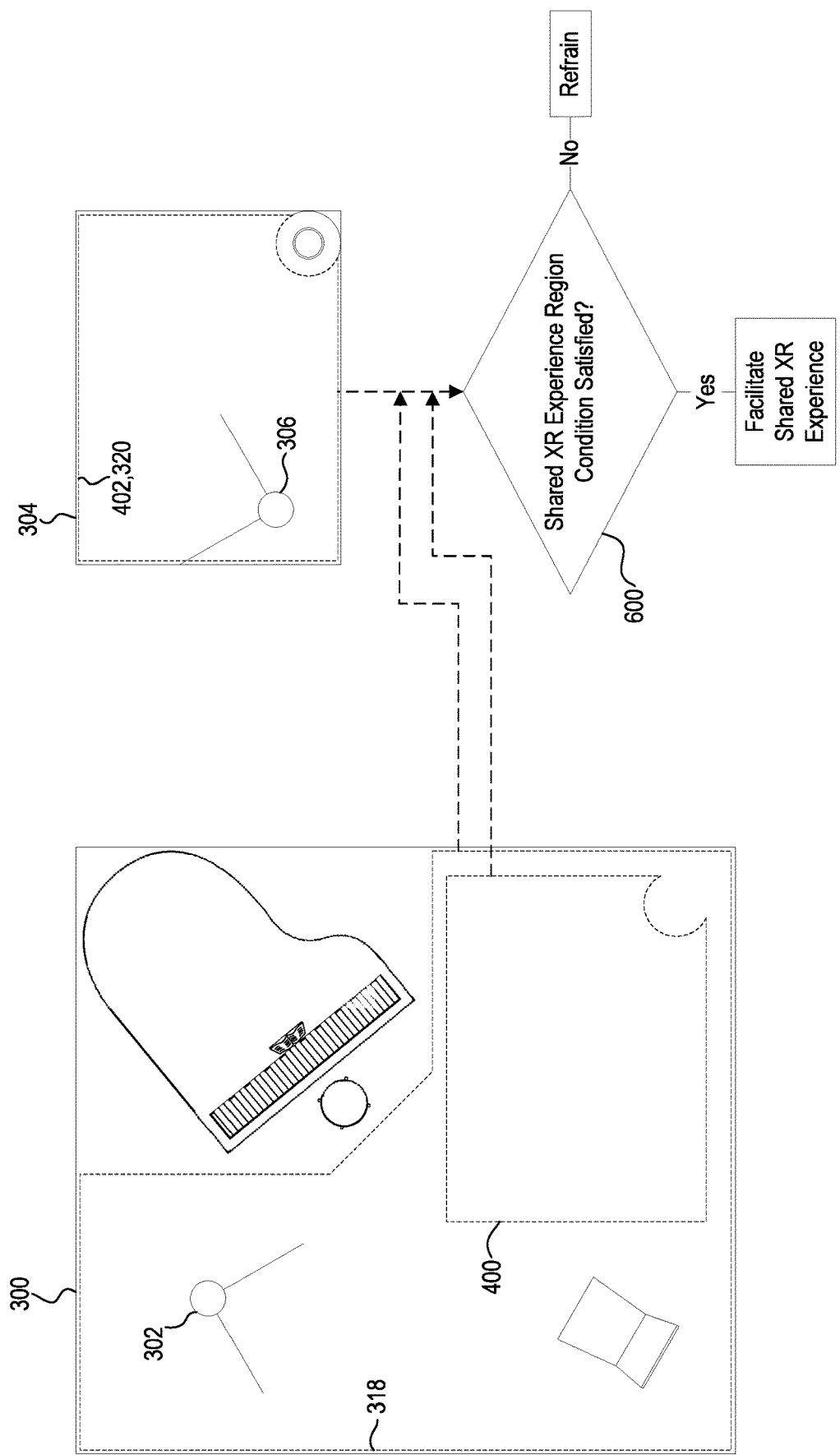
FIG. 6 illustrates a conceptual representation of determining whether an interactable region of a physical environment satisfies a shared XR experience region condition.

FIG. 6 illustrates a conceptual representation of determining whether an interactable region or XR experience region of a physical environment satisfies a shared XR experience region condition. In particular, FIG. 6 illustrates the physical environment 300, first user 302, second physical environment 304, second user 306, first interactable region 318, second interactable region 320, first XR experience region 400, and second XR experience region 402 shown and described hereinabove with reference to FIGS. 3 and 4. FIG. 6 shows that in response to determining an XR experience region (e.g., the first XR experience region 400, the second XR experience region 402, a shared XR experience region) or interactable region (e.g., the first interactable region 318 or second interactable region 320), one or more systems may determine whether the XR experience region or interactable region satisfies a shared XR experience region condition (as indicated by decision block 600). An XR experience region condition may take on various forms, such as an amount and/or shape of volume and/or area available in association with a physical environment for facilitating XR experiences. For example, an XR wall-bound checkers game may require a threshold amount of wall space (or ceiling space) for users to participate. Thus, if one user's physical space fails to provide sufficient wall space, a notification may be provided to the user, and/or the user may be prevented from participating in the shared XR experience.

In response to determining that the XR experience region or interactable region associated with a particular user or physical environment fails to satisfy the shared XR experience region condition, one or more systems may refrain from triggering initialization of a shared XR experience for the particular user or physical environment. Such functionality may prevent users from becoming frustrated by the inability to participate in an XR experience as intended by its designer. In contrast, in response to determining that the XR experience region or interactable region associated with a particular user or physical environment satisfies the shared XR experience region condition, one or more systems may trigger initialization of a shared XR experience for the particular user or physical environment.

In some instances, in response to determining that the XR experience region or interactable region associated with a particular user or physical environment fails to satisfy the shared XR experience region condition, a system may perform other actions, such as providing the particular user with information or selectable options related to other XR experiences that the particular user may participate in (in view of characteristics of the physical environment available to the particular user). In some instances, the system may provide the particular user with information related to how the user could rearrange objects within the physical environment to allow the user to participate in one or more XR experiences. Additionally, or alternatively, a user may be directed to move to a different physical environment (e.g., a different room) to accommodate the shared XR experience.

One will appreciate, in view of the present disclosure, that the designation of an interactable region or XR experience region as "limiting" may be at least somewhat arbitrary in some instances, and that multiple interactable regions or XR experience regions may be regarded as "limiting" in the same or different ways. Thus, as described hereinabove, multiple interactable regions and/or XR experience regions may be used to constrain a shared XR experience region for multiple users. A shared XR experience region may, in some implementations, be regarded as the areal or volumetric intersection of separate interactable regions or separate XR experience regions, or may be regarded as a lowest common denominator of separate interactable regions or separate XR experience regions.

Although the foregoing description focuses, in at least some respects, on implementations that involve two users in respective different physical environments, the principles described herein may be applied to any number of users in any number of physical environments.

Example Method(s) for Facilitating Shared Extended Reality Experiences

The following discussion now refers to a number of methods and method acts that may be performed in accordance with the present disclosure. Although the method acts are discussed in a certain order and illustrated in a flow chart as occurring in a particular order, no particular ordering is required unless specifically stated, or required because an act is dependent on another act being completed prior to the act being performed. One will appreciate that certain embodiments of the present disclosure may omit one or more of the acts described herein.

FIGS. 7, 8, 9, and 10 illustrate example flow diagrams 700, 800, 900, and 1000, respectively, depicting acts associated with facilitating shared XR experiences. The various acts discussed herein may be performed utilizing one or more components of one or more systems (e.g., processors 1102, storage 1104, sensor(s) 1110, input/output system(s) 1112, communication system(s) 1116, etc., as discussed in more detail hereinafter with reference to FIG. 11).

Figure 7:
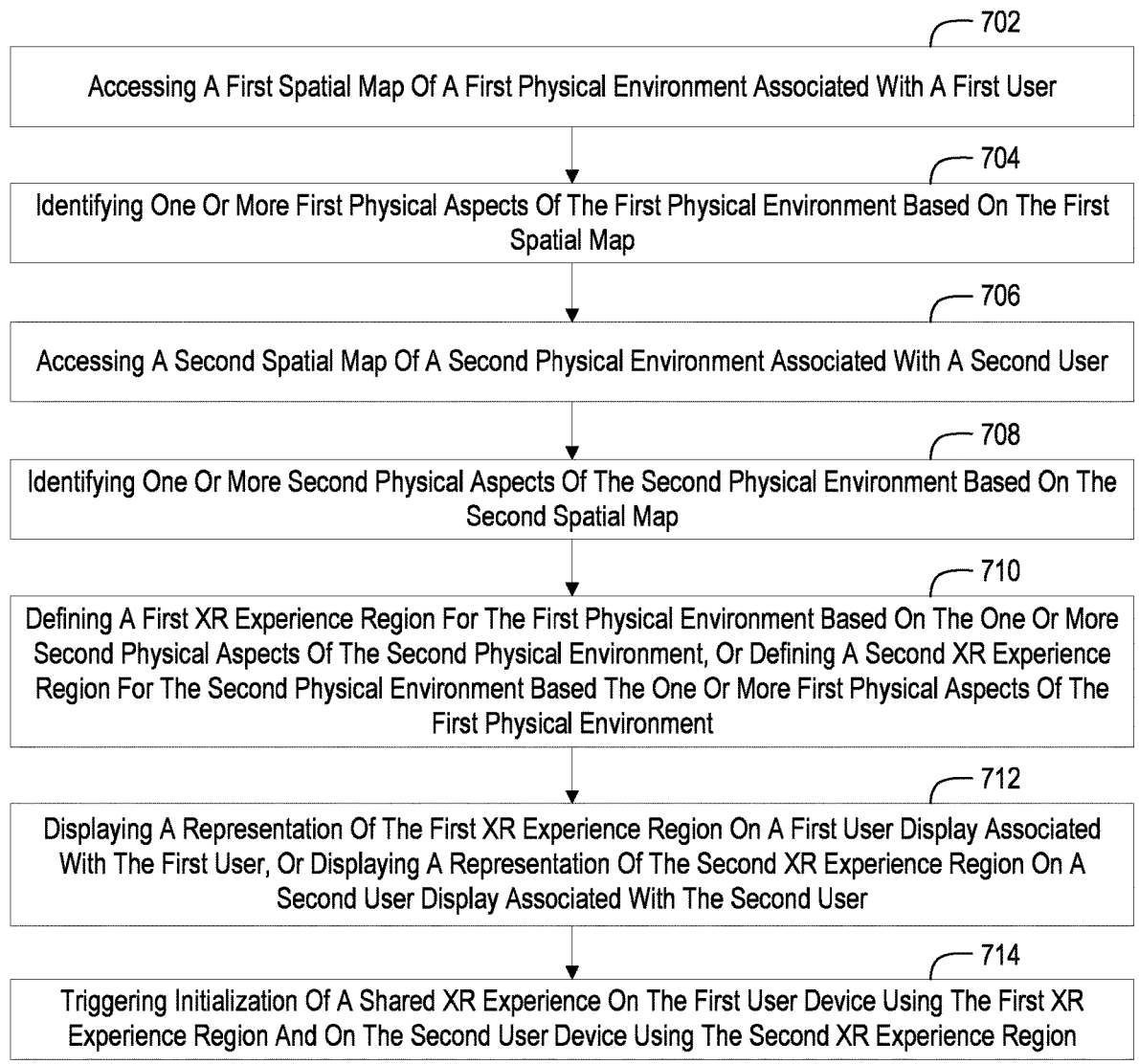
FIGS. 7 through 10 illustrate flow diagrams depicting acts associated with facilitating shared XR experiences.

Act 702 of flow diagram 700 of FIG. 7 includes accessing a first spatial map of a first physical environment associated with a first user. In some implementations, the first spatial map is obtained by a first user device associated with the first user (e.g., an XR device, such as a mobile phone, tablet, HMD, etc.).

Act 704 of flow diagram 700 includes identifying one or more first physical aspects of the first physical environment based on the first spatial map. In some implementations, identifying the one or more first physical aspects of the first physical environment comprises identifying one or more first representations of first physical objects within the first physical environment.

Act 706 of flow diagram 700 includes accessing a second spatial map of a second physical environment associated with a second user. In some instances, the second spatial map is obtained by a second user device associated with the second user (e.g., a separate XR device).

Act 708 of flow diagram 700 includes identifying one or more second physical aspects of the second physical environment based on the second spatial map. In some implementations, identifying the one or more second physical aspects of the second physical environment comprises identifying one or more second representations of second physical objects within the second physical environment.

Act 710 of flow diagram 700 includes defining a first XR experience region for the first physical environment based on the one or more second physical aspects of the second physical environment, or defining a second XR experience region for the second physical environment based the one or more first physical aspects of the first physical environment. Defining the first XR experience region may comprise applying one or more first constraints based on the one or more second representations of the second physical objects within the second physical environment. Similarly, defining the second XR experience region may comprise applying one or more second constraints based on the one or more first representations of the first physical objects within the first physical environment. The first constraints and/or second constraints may comprise, for example, volumetric or areal constraints based on geometry of the objects represented in the first or second physical environments.

In some implementations, the first XR experience region and the second XR experience region each comprise a substantially identical volume or area. The substantially identical volume or area may be defined by boundaries shaped based on at least some of the first physical objects within the first physical environment and/or based on at least some of the second physical objects within the second physical environment.

Act 712 of flow diagram 700 includes displaying a representation of the first XR experience region on a first user display associated with the first user, or displaying a representation of the second XR experience region on a second user display associated with the second user. In some implementations, the representation of the first XR experience region includes one or more first virtual objects that corresponds to the one or more second representations of the second physical objects within the second physical environment. Similarly, in some instances, the representation of the second XR experience region includes one or more second virtual objects that correspond to the one or more first representations of the first physical objects within the first physical environment.

Act 714 of flow diagram 700 includes triggering initialization of a shared XR experience on the first user device using the first XR experience region and on the second user device using the second XR experience region.

Figure 8:
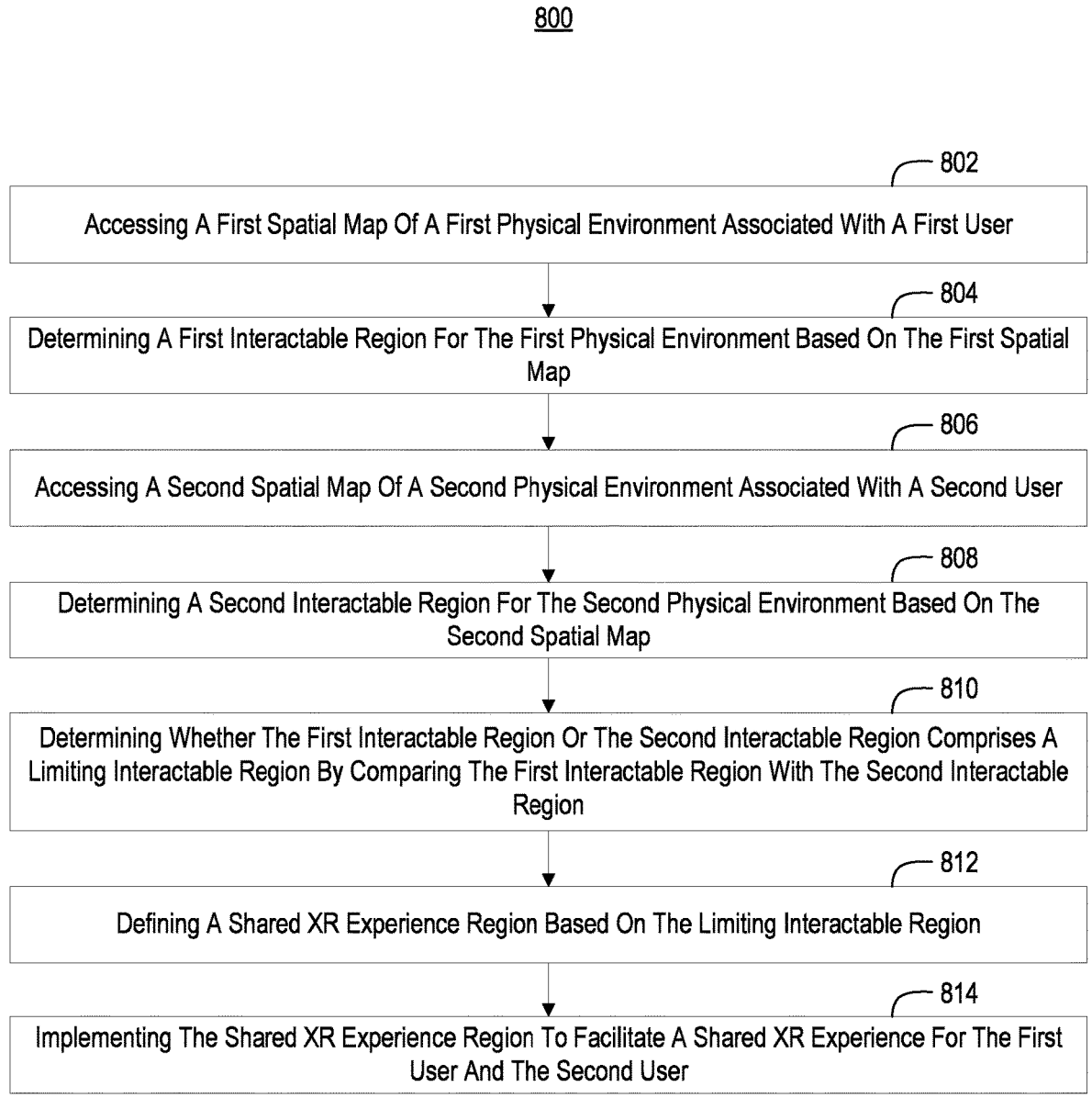

Act 802 of flow diagram 800 of FIG. 8 includes accessing a first spatial map of a first physical environment associated with a first user. In some implementations, the first spatial map is obtained by a first user device associated with the first user (e.g., an XR device, such as a mobile phone, tablet, HMD, etc.).

Act 804 of flow diagram 800 includes determining a first interactable region for the first physical environment based on the first spatial map. In some implementations, the first spatial map comprises one or more first representations of one or more first objects within the first physical environment. Furthermore, in some instances, determining the first interactable region includes defining a first volume or area within the first physical environment, where the first volume or area includes first boundaries based on one or more first representations of first physical objects identified within the first physical environment.

Act 806 of flow diagram 800 includes accessing a second spatial map of a second physical environment associated with a second user. In some implementations, the second spatial map is obtained by a second user device associated with the second user (e.g., an XR device, such as a mobile phone, tablet, HMD, etc.).

Act 808 of flow diagram 800 includes determining a second interactable region for the second physical environment based on the second spatial map. In some implementations, the second spatial map includes one or more second representations of one or more second objects within the second physical environment. Furthermore, in some implementations, determining the second interactable region includes defining a second volume or area within the second physical environment, where the second volume or area includes second boundaries based on one or more second representations of second physical objects identified within the first physical environment.

Act 810 of flow diagram 800 includes determining whether the first interactable region or the second interactable region comprises a limiting interactable region by comparing the first interactable region with the second interactable region. Whether the first interactable region or the second interactable region comprises a limiting interactable region may be determined based on various factors, and the factors may depend on the shared XR experience in which the users wish to participate. For example, a limiting interactable region may comprise the region with the smallest available open area or volume (e.g., corresponding to one or more particular shapes/sizes) that is optionally not obstructed by physical objects (or not obstructed by certain types/numbers/sizes/shapes of physical objects).

Act 812 of flow diagram 800 includes defining a shared XR experience region based on the limiting interactable region. In some instances, the shared XR experience region is defined based on (i) the one or more first representations of the one or more first objects within the first physical environment and/or (ii) the one or more second representations of the one or more second objects within the second physical environment.

Act 814 of flow diagram 800 includes implementing the shared XR experience region to facilitate a shared XR experience for the first user and the second user. Implementing the shared XR experience region to facilitate the shared XR experience for the first user and the second user may comprise triggering display of the shared XR experience region on the first user device and on the second user device.

Figure 9:
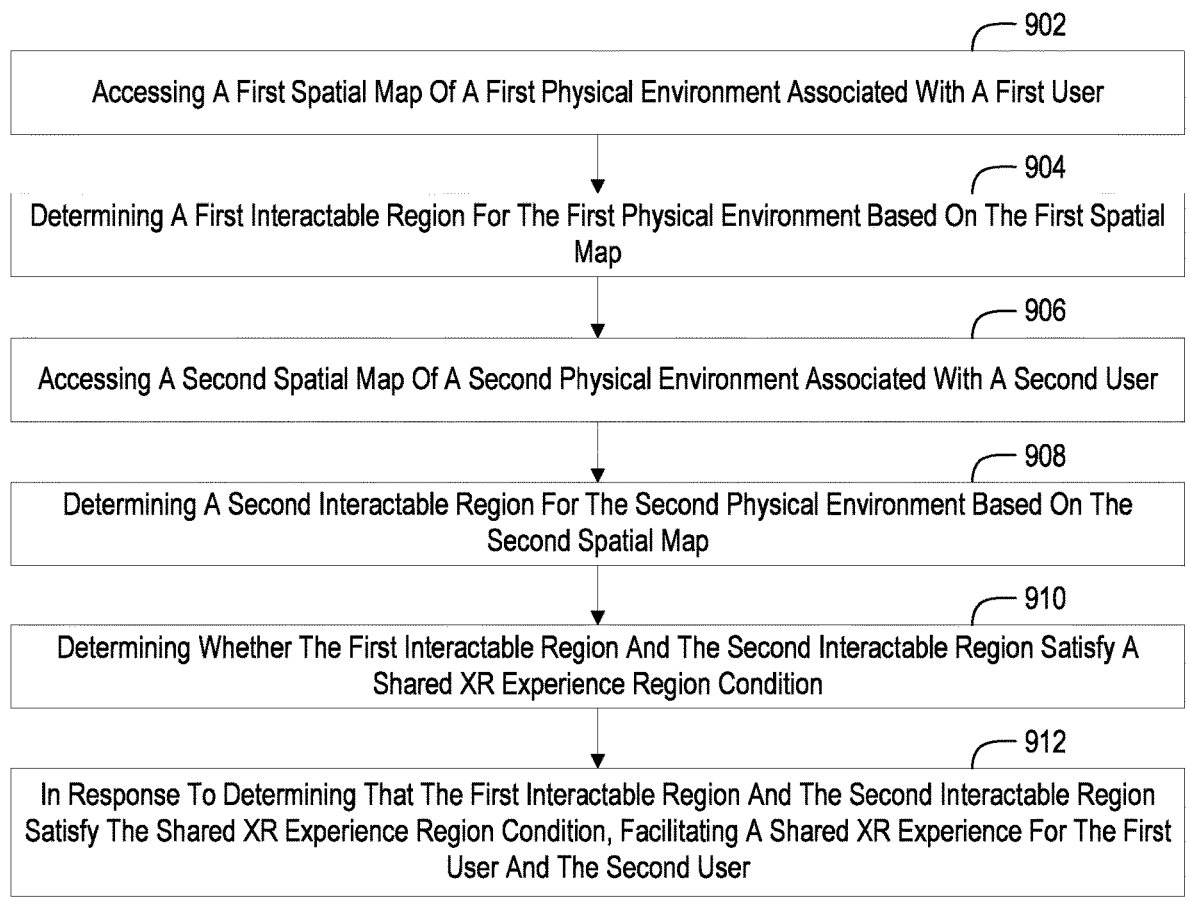

Act 902 of flow diagram 900 of FIG. 9 includes accessing a first spatial map of a first physical environment associated with a first user. In some implementations, the first spatial map is obtained by a first user device associated with the first user (e.g., an XR device, such as a mobile phone, tablet, HMD, etc.).

Act 904 of flow diagram 900 includes determining a first interactable region for the first physical environment based on the first spatial map. In some implementations, the first spatial map comprises one or more first representations of one or more first objects within the first physical environment. Furthermore, in some instances, determining the first interactable region includes defining a first volume or area within the first physical environment, where the first volume or area includes first boundaries based on one or more first representations of first physical objects identified within the first physical environment.

Act 906 of flow diagram 900 includes accessing a second spatial map of a second physical environment associated with a second user. In some implementations, the second spatial map is obtained by a second user device associated with the second user (e.g., an XR device, such as a mobile phone, tablet, HMD, etc.).

Act 908 of flow diagram 900 includes determining a second interactable region for the second physical environment based on the second spatial map. In some implementations, the second spatial map includes one or more second representations of one or more second objects within the second physical environment. Furthermore, in some implementations, determining the second interactable region includes defining a second volume or area within the second physical environment, where the second volume or area includes second boundaries based on one or more second representations of second physical objects identified within the first physical environment.

Act 910 of flow diagram 900 includes determining whether the first interactable region and the second interactable region satisfy a shared XR experience region condition. An XR experience region condition may take on various forms, such as a size and/or shape of volume and/or area available in association with a physical environment for facilitating XR experiences, density/type/quantity/shape/size of one or more objects within the physical environment, and/or others.

Act 912 of flow diagram 900 includes, in response to determining that the first interactable region and the second interactable region satisfy the shared XR experience region condition, facilitating a shared XR experience for the first user and the second user. In contrast, in some instances, a system may refrain from facilitating or initiating a shared XR experience in response to determining that the first interactable region or the second interactable region satisfy the shared XR experience region condition.

Figure 10:
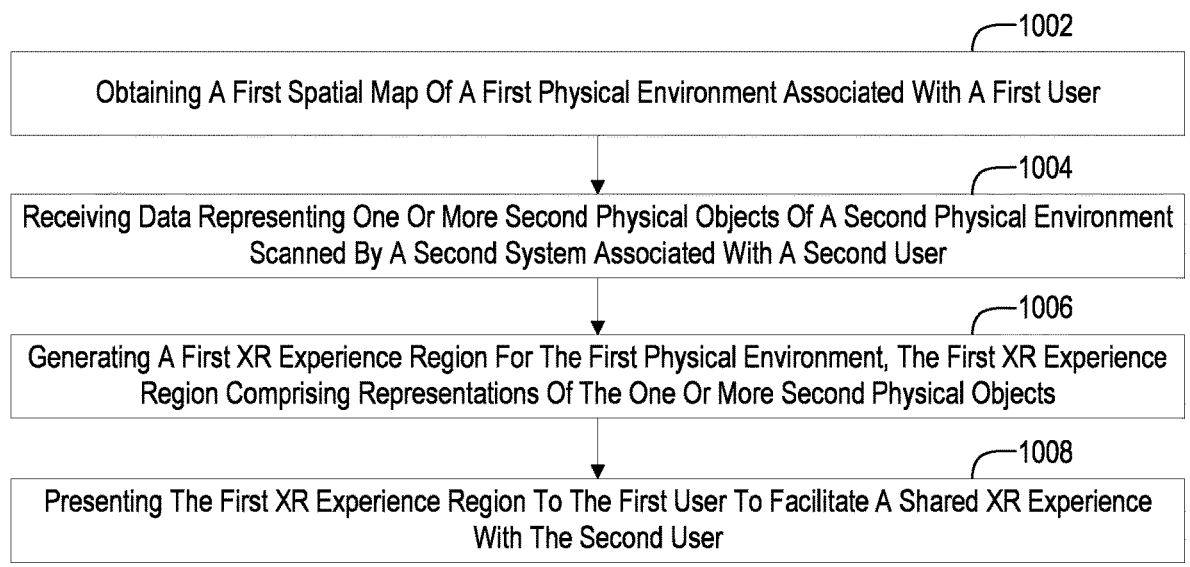

Act 1002 of flow diagram 1000 of FIG. 10 includes obtaining a first spatial map of a first physical environment associated with a first user. In some implementations, the first spatial map is obtained by a first user device associated with the first user (e.g., an XR device, such as a mobile phone, tablet, HMD, etc.).

Act 1004 of flow diagram 1000 includes receiving data representing one or more second physical objects of a second physical environment scanned by a second system associated with a second user. The data may be obtained based on a second spatial map captured for the second physical environment by the second system associated with the second user (e.g., a separate XR device associated with the second user).

Act 1006 of flow diagram 1000 includes generating a first XR experience region for the first physical environment, the first XR experience region comprising representations of the one or more second physical objects. The placement of the representations of the one or more second physical objects within the first XR experience region may be selected such that the first XR experience region corresponds to a second XR experience region generated for use by the second user in the second physical environment.

Act 1008 of flow diagram 1000 includes presenting the first XR experience region to the first user to facilitate a shared XR experience with the second user. In this way, representations of physical objects that constrain the second user's participation in the shared XR experience may be virtually implemented into the first XR experience region for the first user, thereby causing both users to undergo the same participation constraints.

Additional Details Related to Implementing the Disclosed Embodiments

The principles disclosed herein may be implemented in various formats. For example, the various techniques discussed herein may be performed as a method that includes various acts for achieving particular results or benefits. In some instances, the techniques discussed herein are represented in computer-executable instructions that may be stored on one or more hardware storage devices. The computer-executable instructions may be executable by one or more processors to carry out (or to configure a system to carry out) the disclosed techniques. In some embodiments, a system may be configured to send the computer-executable instructions to a remote device to configure the remote device for carrying out the disclosed techniques.

Figure 11:
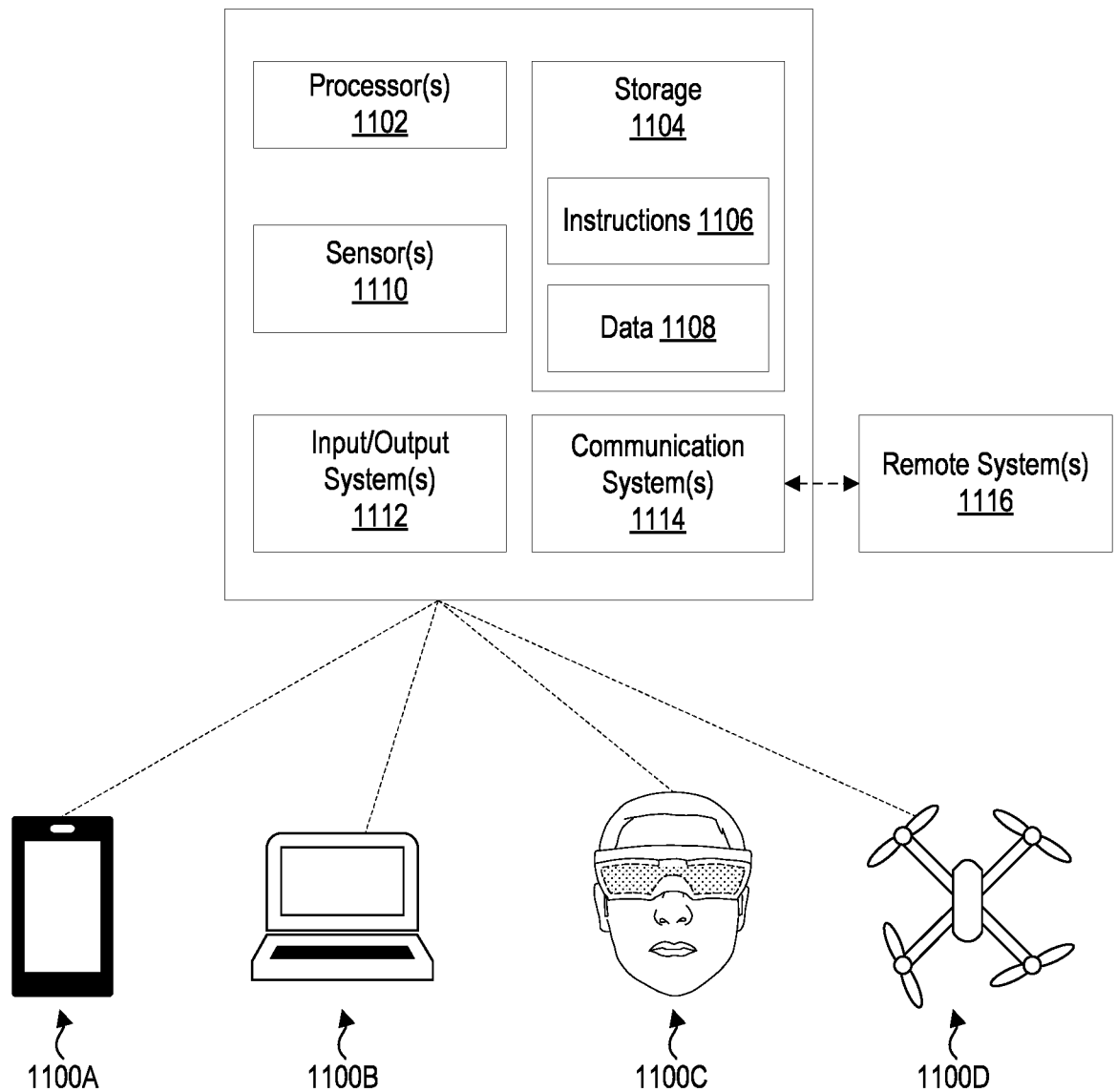
FIG. 11 illustrates example components of an example system that may include or be used to implement one or more disclosed embodiments.

FIG. 11 illustrates various example components of a system 1100 that may be used to implement one or more disclosed embodiments. For example, FIG. 11 illustrates that a system 1100 may include processor(s) 1102, storage 1104, sensor(s) 1110, input/output system(s) 1112 (I/O system(s) 1112), and communication system(s) 1114. Although FIG. 11 illustrates a system 1100 as including particular components, one will appreciate, in view of the present disclosure, that a system 1100 may comprise any number of additional or alternative components.

The processor(s) 1102 may comprise one or more sets of electronic circuitries that include any number of logic units, registers, and/or control units to facilitate the execution of computer-readable instructions (e.g., instructions that form a computer program). Such computer-readable instructions may be stored within storage 1104. The storage 1104 may comprise physical system memory and may be volatile, non-volatile, or some combination thereof. Furthermore, storage 1104 may comprise local storage, remote storage (e.g., accessible via communication system(s) 1114 or otherwise), or some combination thereof. Additional details related to processors (e.g., processor(s) 1102) and computer storage media (e.g., storage 1104) will be provided hereinafter.

In some implementations, the processor(s) 1102 may comprise or be configurable to execute any combination of software and/or hardware components that are operable to facilitate processing using machine learning models or other artificial intelligence-based structures/architectures. For example, processor(s) 1102 may comprise and/or utilize hardware components or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, generative adversarial networks, liquid state machines, extreme learning machines, echo state networks, deep residual networks, Kohonen networks, support vector machines, neural Turing machines, and/or others.

As will be described in more detail, the processor(s) 1102 may be configured to execute instructions 1106 stored within storage 1104 to perform certain actions associated with imaging using SPAD arrays. The actions may rely at least in part on data 1108 (e.g., avalanche event counting or tracking, etc.) stored on storage 1104 in a volatile or non-volatile manner.

In some instances, the actions may rely at least in part on communication system(s) 1114 for receiving data from remote system(s) 1116, which may include, for example, separate systems or computing devices, sensors, and/or others. The communications system(s) 1114 may comprise any combination of software or hardware components that are operable to facilitate communication between on-system components/devices and/or with off-system components/devices. For example, the communications system(s) 1114 may comprise ports, buses, or other physical connection apparatuses for communicating with other devices/components. Additionally, or alternatively, the communications system(s) 1114 may comprise systems/components operable to communicate wirelessly with external systems and/or devices through any suitable communication channel(s), such as, by way of non-limiting example, Bluetooth, ultra-wideband, WLAN, infrared communication, and/or others.

FIG. 11 illustrates that a system 1100 may comprise or be in communication with sensor(s) 1110. Sensor(s) 1110 may comprise any device for capturing or measuring data representative of perceivable or detectable phenomenon. By way of non-limiting example, the sensor(s) 1110 may comprise one or more image sensors, microphones, thermometers, barometers, magnetometers, accelerometers, gyroscopes, and/or others.

Furthermore, FIG. 11 illustrates that a system 1100 may comprise or be in communication with I/O system(s) 1112. I/O system(s) 1112 may include any type of input or output device such as, by way of non-limiting example, a touch screen, a mouse, a keyboard, a controller, and/or others, without limitation. For example, the I/O system(s) 1112 may include a display system that may comprise any number of display panels, optics, laser scanning display assemblies, and/or other components.

FIG. 11 conceptually represents that the components of the system 1100 may comprise or utilize various types of devices, such as mobile electronic device 1100A (e.g., a smartphone), personal computing device 1100B (e.g., a laptop), an XR head-mounted display 1100C (HMD 1100C), an aerial vehicle 1100D (e.g., a drone), and/or other devices. Although the present description may focus, in at least some respects, on utilizing an HMD to implement techniques of the present disclosure, additional or alternative types of systems may be used.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that merely carry computer-executable instructions without storing the computer-executable instructions are "transmission media." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

A "network" is defined as one or more data links that enable the transport of electronic data between computer systems and/or modules and/or other electronic devices.

When information is transferred or provided over a network or another communications connection (either hardwired, wireless, or a combination of hardwired or wireless) to a computer, the computer properly views the connection as a transmission medium. Transmission media can include a network and/or data links which can be used to carry program code in the form of computer-executable instructions or data structures, and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system configured for facilitating shared extended reality (XR) experiences, the system comprising:
   one or more processors; and
   one or more hardware storage devices that store instructions that are executable by the one or more processors to configure the system to:
   access a first spatial map of a first physical environment associated with a first user;
   identify one or more first physical aspects of the first physical environment based on the first spatial map;
   access a second spatial map of a second physical environment associated with a second user;
   identify one or more second physical aspects of the second physical environment based on the second spatial map; and
   define a first XR experience region for the first physical environment based on the one or more second physical aspects of the second physical environment, or define a second XR experience region for the second physical environment based the one or more first physical aspects of the first physical environment, wherein the first XR experience region and the second XR experience region each comprise a substantially identical volume or area, the substantially identical volume or area being defined by boundaries shaped based on at least some of the one or more first physical aspects of the first physical environment and based on at least some of the one or more second physical aspects of the second physical environment.

2. The system of claim 1, wherein:
   identifying the one or more first physical aspects of the first physical environment comprises identifying one or more first representations of first physical objects within the first physical environment;
   identifying the one or more second physical aspects of the second physical environment comprises identifying one or more second representations of second physical objects within the second physical environment;

defining the first XR experience region comprises applying one or more first constraints based on the one or more second representations of the second physical objects within the second physical environment; and defining the second XR experience region comprises applying one or more second constraints based on the one or more first representations of the first physical objects within the first physical environment.

3. The system of claim 2, wherein the instructions are executable by the one or more processors to configure the system to display a representation of the first XR experience region on a first user display associated with the first user, or display a representation of the second XR experience region on a second user display associated with the second user.

4. The system of claim 3, wherein:
the representation of the first XR experience region includes one or more first virtual objects that corresponds to the one or more second representations of the second physical objects within the second physical environment; and
the representation of the second XR experience region includes one or more second virtual objects that correspond to the one or more first representations of the first physical objects within the first physical environment.

5. The system of claim 2, wherein the instructions are executable by the one or more processors to configure the system to:
determine a first interactable region based on the one or more first representations of the first physical objects within the first physical environment;
determine a second interactable region based on the one or more second representations of the second physical objects within the second physical environment; and
determining whether the first interactable region or the second interactable region is a limiting interactable region by comparing the first interactable region with the second interactable region, wherein:
when the limiting interactable region is the first interactable region, the one or more second constraints comprise the first interactable region, and
when the limiting interactable region is the second interactable region, the one or more first constraints comprise the second interactable region.

6. The system of claim 5, wherein:
determining the first interactable region comprises defining a first volume within the first physical environment, the first volume comprising first boundaries based on the one or more first representations of the first physical objects within the first physical environment; and
determining the second interactable region comprises defining a second volume within the second physical environment, the second volume comprising second boundaries based on the one or more second representations of the second physical objects within the first physical environment.

7. The system of claim 1, wherein the first spatial map is obtained by a first user device associated with the first user, and wherein the second spatial map is obtained by a second user device associated with the second user.

8. The system of claim 7, wherein the instructions are executable by the one or more processors to configure the system to trigger initialization of a shared XR experience on the first user device using the first XR experience region and on the second user device using the second XR experience region.

9. The system of claim 7, wherein the instructions are executable by the one or more processors to configure the system to:
obtain a shared XR experience region condition;
determine whether the first XR experience region or the second XR experience region satisfy the shared XR experience region condition; and
in response to determining that the first XR experience region or the second XR experience region fail to satisfy the shared XR experience region condition, refrain from triggering initialization of a shared XR experience on the first user device and the second user device.

10. A system configured for facilitating shared extended reality (XR) experiences, the system comprising:
one or more processors; and
one or more hardware storage devices that store instructions that are executable by the one or more processors to configure the system to:
access a first spatial map of a first physical environment associated with a first user;
determine a first interactable region for the first physical environment based on the first spatial map;
access a second spatial map of a second physical environment associated with a second user;
determine a second interactable region for the second physical environment based on the second spatial map;
determine whether the first interactable region or the second interactable region comprises a limiting interactable region by comparing the first interactable region with the second interactable region;
define a shared XR experience region based on at least the limiting interactable region; and
implement the shared XR experience region to facilitate a shared XR experience for the first user and the second user.

11. The system of claim 10, wherein determining the first interactable region comprises defining a first volume within the first physical environment, the first volume comprising first boundaries based on one or more first representations of first physical objects identified within the first physical environment, and wherein determining the second interactable region comprises defining a second volume within the second physical environment, the second volume comprising second boundaries based on one or more second representations of second physical objects identified within the first physical environment.

12. The system of claim 10, wherein the instructions are executable by the one or more processors to further configure the system to determine whether the first interactable region and the second interactable region satisfy a shared XR experience region condition.

13. The system of claim 12, wherein execution of the instructions configures the system to implement the shared XR experience region to facilitate the shared XR experience for the first user and the second user in response to determining that the first interactable region and the second interactable region satisfy the shared XR experience region condition.

14. The system of claim 10, wherein the first spatial map comprises one or more first representations of one or more first objects within the first physical environment, and wherein the second spatial map comprises one or more second representations of one or more second objects within the second physical environment.

15. The system of claim 14, wherein the shared XR experience region is defined based on (i) the one or more first representations of the one or more first objects within the first physical environment or (ii) the one or more second representations of the one or more second objects within the second physical environment.

16. The system of claim 15, wherein the shared XR experience region is defined based on (i) the one or more first representations of the one or more first objects within the first physical environment and (ii) the one or more second representations of the one or more second objects within the second physical environment.

17. The system of claim 10, wherein the first spatial map is obtained by a first user device associated with the first user, and wherein the second spatial map is obtained by a second user device associated with the second user.

18. The system of claim 17, wherein implementing the shared XR experience region to facilitate the shared XR experience for the first user and the second user comprise triggering display of the shared XR experience region on the first user device and on the second user device.

19. A system configured for facilitating shared extended reality (XR) experiences, the system comprising:
one or more processors; and
one or more hardware storage devices that store instructions that are executable by the one or more processors to configure the system to:
obtain a first spatial map of a first physical environment associated with a first user;
receive data representing one or more second physical objects of a second physical environment scanned by a second system associated with a second user;
generate a first XR experience region for the first physical environment, the first XR experience region defining an area or volume within the first physical environment, the first XR experience region comprising one or more representations of the one or more second physical objects, wherein the one or more representations of the one or more second physical objects are positioned within the area or volume within the first physical environment; and
present the first XR experience region to the first user to facilitate a shared XR experience with the second user.

\* \* \* \* \*